Oct. 1, 1968 A. J. A. J. DUJARDIN 3,404,088

METHOD FOR PURIFYING WATER

Filed Sept. 4, 1964 2 Sheets-Sheet 1

INVENTOR.
ALBERT JEAN ARMAND JULIEN DUJARDIN
BY
E. M. Squire
his attorney

METHOD FOR PURIFYING WATER

Filed Sept. 4, 1964 2 Sheets-Sheet 2

INVENTOR.
ALBERT JEAN ARMAND JULIEN DUJARDIN

BY

E. M. Squire his attorney

United States Patent Office 3,404,088

Patented Oct. 1, 1968

1

3,404,088
METHOD FOR PURIFYING WATER

Albert Jean Armand Julien Dujardin, Remicourt, Belgium, assignor to Ecremeuses Melotte, Société Anonyme, Remicourt, Beligum, a Belgian company Continuation-in-part of application Ser. No. 74,062, Dec. 6, 1960. This application Sept. 4, 1964, Ser. No. 394,425
Claims priority, application Luxembourg, Nov. 11, 1960, 39,396
4 Claims. (Cl. 210—44)

This application is a continuation-in-part of my copending application Serial No. 74,062 filed on Dec. 6, 1960, now abandoned.

My present invention relates to a method for clarifying liquids and more particularly for cleaning sewage and/or industrial water, spring-water or other water for human consumption and swimming pool water.

The problem with which the invention is concerned arises from the fact that waste water such as sewage water not only contains particles which may be caused to flocculate but also contains very small solid particles which are not flocculable and which cannot be separated by decantation and are present in the water or are produced by the addition of mineral salts or reagents having an operative function in the purification or clarification of the aqueous component of the liquid.

The invention takes also into consideration the fact that waste water oxidizes rapidly and this in view of the presence of aerobical microorganisms which cause the formation of flocculent magmas in the course of the vital processes of the organisms, these magmas being subsequently decantable.

According to the invention, an intimate contact is produced by mechanical means between the liquid to be purified and the atmosphere in order to obtain complete oxidation of the water being tested and of the flocculating reagents or salts added to the latter which are mineral salts that are soluble in the water and render possible the coating and/or the fixing of the solid impurities carried or conveyed in the water during the subsequent flocculation which takes place through the addition of an electrolyte causing coprecipitation of the flocculatable salts and of the solid bodies in ordinary or in colloidal suspension.

An important point is the addition of mineral salts which are readily soluble in the liquid and which precipitate as flocs when an electrolyte is added that modifies the pH of the mother liquid.

In this way the solids which initially were contained in the water are coated and the salts which are added enclose or envelop the solids to be eliminated. Such flocs are thick and heavy and are readily separated by decantation.

The salts that are added produce, when the electrolyte is added, a coprecipitation of the salts which will flocculate together with the solid particles.

As soon as the precipitation occurs the compound flocs become thicker and thicker during the course of a mixing operation of the ionized solution, the precipitation taking place slowly.

The advantage is that when the decantation is commenced, the liquid is satisfactorily clarified and a further filtration is not necessary.

It is only necessary to submit the sludge which may be expected not to exceed 5% of total volume to be treated, to a drying or pressing operation.

Another consequence is that if final filtration is desired, the surfaces of the filter elements needed for the clarification of the water may be reduced to 1/20 of the area generally necessary.

An important point is the nature of the reagent or compound producing the coating or enveloping flocculation.

2

It is possible to dissolve into water ferric chloride, ferric sulphate or an aluminum sulfate and to cause the flocculation of all the solids and salts which are present, by the addition of an electrolyte.

This flocculation could, alternatively, be executed by dissolving into the liquid a salt such as ferric chloride, ferric sulphate or aluminium sulphate and in causing all the solids and salts to flocculate by the addition of an electrolyte, such as CaO.

But such methods are impractical because they are too expensive and it is suggested to use a ferrous salt (such as $FeSO_4 \cdot 7H_2O$) which is produced in great quantity in the metallurgical industry.

This ferrous salt does not flocculate readily in the ferrous state but very easily and completely when converted to the ferric state and an aspect of the process is based on this observation.

During a second stage, I produce in a manner disclosed for instance in French Patent No. 1,011,593 the complete dispersion of the air inside the liquid in a manner such as to form a system wherein the air and the gases and also the flocculated or the flocculable solids are in an extremely finely divided condition, the air forming then miniature bubbles and the solids forming miniature particles, whereby the flocs are buoyant.

In order to allow my invention to be properly understood, I will describe preferred embodiments of my methods with reference to the accompanying drawing forming a part hereof.

Figure 1:
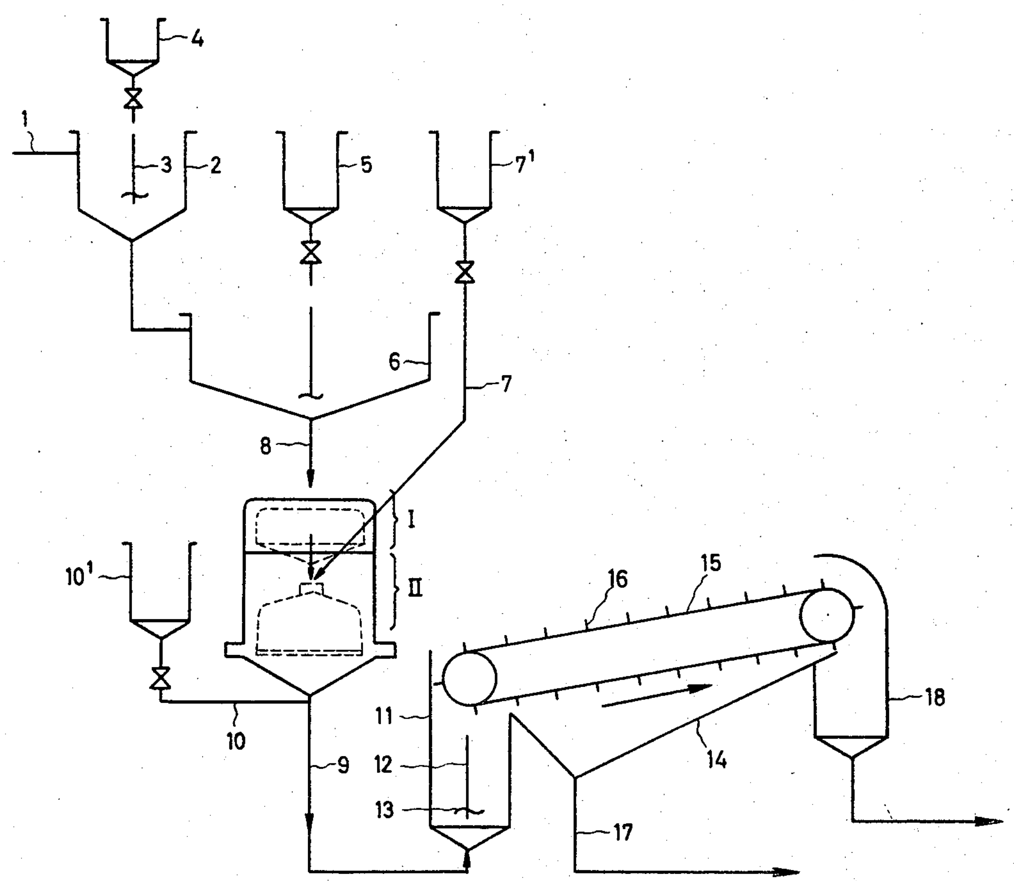
FIG. 1 is a flow-chart diagram.

Turning to FIG. 1, the sewage water and/or the like liquid to be treated or purified is fed by a pipe 1 into a vat 2 provided with a mixing device 3. A flocculatable metal salt is introduced into the vat 1, either in a solid condition or as a solution, being a metal salt fed from a container 4. Suitable salts are sulfate of aluminium, ferrous and/or ferric chloride but preferably ferrous sulfate for reasons of cost economy.

The sewage water to which the flocculable salts have been added enters then a further vat 6 into which there is poured out of a vat 5 the electrolytic precipitating reagent, such as CaO, $K_2CO_3$, $CaCO_3$, or $NH_4OH$ which ensures the correct adjustment of pH to the desired value in the vat 6 for the water being treated; preferably there is obtained a neutral pH when this is directly feasible as is the case of sewage water or else a higher pH when it is desired to make substances such as manganese salts flocculate, which salts may be found naturally or be incorporated purposely with the input water being treated when the water is for human consumption. The water is then adjusted to a pH of 7, corresponding to neutrality after clarification has been completed.

The flocculable salts and the electrolyte are thus introduced successively into the two separate vats 2 and 6.

The sewage or other water thus flocculated is introduced through a pipe 8 into a first stage shown at I of a preliminary centrifugal beating apparatus.

The reagent and also the flocculated solids carried by the liquid are subjected in this preliminary beating apparatus to an intense stirring during which the oxidation is obtained while the water remains in said stage I.

A more detailed description of said stirring or beating apparatus is set forth below.

The time during which the pre-treated water remains in the first stage of the centrifugal apparatus inside which the stirring is being performed depends in particular on the temperature of operation, on the nature of the flocculated substances involved and on the reagents which have been selected. Said time may range between a few seconds and several minutes.

In the case of sewage water and when using ferrous sulfate, the time during which the substances remain in the centrifugal apparatus may reach three and one half minutes while said duration may be reduced to 10 to 15 seconds when the salt used is ferric chloride.

In all cases, the duration of this centrifugal treatment is reduced to the minimum consistent with the production of water which, after passage through the first stage I of the centrifugal dispensing or beating apparatus, is indifferent to the action of $KM_nO_4$.

This result having been obtained, the stirred water flow into the second stage of the beating or dispersing apparatus into the input of which stage may be added by pipe 7 connected with a container 7' a frothing reagent such as pine oil and/or a collecting reagent such as oleic acid.

Said dispersing apparatus is generally a centrifugal apparatus such as that described by the assignee company, Ecremeuses Melotte, in their French Patent 1,027,417, and serving for the execution of the method according to the French Patent 1,011,593, which method for separating one or more of the components suspended inside a mother liquor, consists in producing an intimate mixture of water with air and/or a gas and with solid material as soon as the liquid is exhausted out of a dispersing rotor; in such a mixture, the air and/or the gases are kept in an extremely finely divided condition of miniature bubbles which causes the flocs, when formed, to be buoyant and allows the subsequent separation through a reversed settling of the solid particles which rise to the surface of the treated liquid, the liquid having previously been brought into a quiescent zone.

The emulsion produced in stage II flows out through the pipe 9 into which, if required, a predetermined amount of a flocculation intensifying materials is introduced from a container $10^1$ through the pipe 10. Such intensifying reagents are well known in the art and are commercially sold under the registered trademark Separan.

The liquid thus obtained, in which the solid particles carried have now been conditioned to collect so as to form flocs or micellary masses, moves upwardly inside a cylindrical or a prismatic vat 11 in which is fitted a stirrer 12 carrying blades 13 and revolving at a very low speed, say 20 to 50 r.p.m., so as to produce micellary masses which are as large as possible, *inter alia* through the combined action of the slow stirring means and of the flocculation intensifying reagent, if such reagent has been added to the liquid.

Said micellary masses which are replete with miniature bubbles of air or of a gas are buoyant and float up to the upper section of the vat 11 and flow out into a reversed settling tank 14 in which the liquid may stay between 2 and 15 minutes.

It is advantageous, if desired, to skim off the micellary masses by means of an inclined endless conveyor 15 provided with blades 16 and of which a section extends above the vat 11.

Said endless conveyor moves over the tank 14 forming a flotation container and constructed for instance, in accordance with the teachings of the French Patent 1,137,821, in which container the side facing the input of the liquid is that over which the skimming blades engage the liquid so as to rise out of the liquid when half-way through the container and to lie at the end of their travel, clearly above and outside said liquid, whereby, during the latter portion of said travel and up to its end, they may convey with them, the floating micellary masses.

Under such conditions, there is obtained at the surface of the liquid in the tank 14, a continuous skimming of the buoyant sludge which has risen to the surface and which is practically dry or very nearly so.

The purified water or liquid is tapped continuously at 17 out of the bottom of the tank 14 while the floating sludge is delivered into a container 18.

Figure 2:
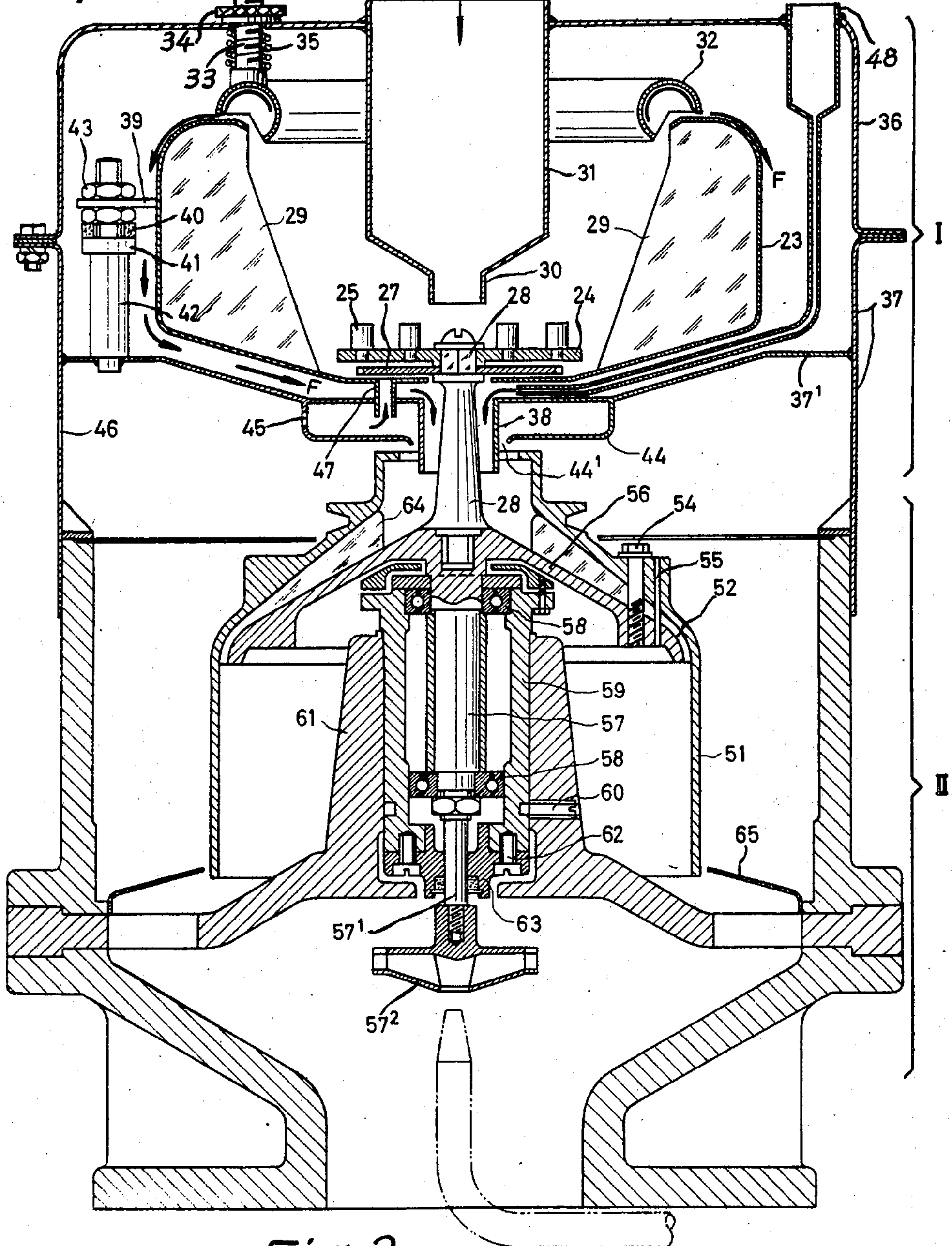
FIG. 2 is a sectional view of a two stage double-acting dispersing apparatus used in practicing the invention.

I will now describe with reference to FIG. 2, centrifugal apparatus which may be used in connection with my improved method. Said apparatus includes a substantially cylindrical and/or polygonal inner receptacle or vat 23 immediately above the bottom of which there revolves at a high speed, a stirring or beating member 24 preferably carrying upstanding pins 25.

The vat 23 and the parts forming the first stage of the apparatus are housed inside a casing 37 which also encloses the second stage.

The beating member 24 may be constituted by a plate or by a cross-shaped member not shown.

Underneath the plate 24 is located a toothed wheel 27 keyed to the same spindle 28 as plate 24.

The clearance or spacing between the toothed disc 27 and the bottom of the vat 23 is as small as possible since the toothed disc can prevent any return of the untreated water between the rotary spindle and the bore formed in the vat for the passage of said spindle. It avoids the necessity of providing a fluidtight packing at such a point, which packing would become worn after some time of use and would continuously absorb a substantial fraction of the total energy required for driving the apparatus.

The vat 23 carries inwardly directed blades or baffles 29 which extend in a substantially radial direction and constrain the liquid jets to return over the beating member 24.

The vat 23 is fed through a nozzle 30 which lies at the bottom of a funnel 31, the cross-section of which allows if required the use of a float which is not illustrated so as to ensure a contsant head above the nozzle 30 and thus, a constant flow. The feed of said vat may also be controlled by a pump.

When the amount of liquid moving inside the vat 23 is such that it overflows, the overflowing liquid passes under an annular tubular member 32 of which a section is cut off and which is secured to the cover 36 of the casing 37 for instance by means of threaded rods 33 provided with knurled adjusting nuts 34 and surrounded by helical compression springs 35.

The excess water, even in a frothy condition, flows along the circuit defined by the arrows F and passes between the bottom of the vat 23 and the bottom $37^1$ of the upper portion of casing 37 towards an outlet 38 which allows the water to flow into the second stage of the apparatus at II.

Preferably, the vat 23 is resiliently mounted by lugs 39 provided thereon and which bear on elastic pads 40 resting on flanges 41 formed on upstanding rods 42 secured to the bottom $37^1$ of the casing 37 and clamped in position by associated nuts 43.

Underneath the bottom $37^1$ of the casing 37 there is provided a box-shaped structure 44 the bottom of which leaves between it and the channel 38 a space $44^1$ and which delivers the water or the like liquid directly out of the vat 23 into the second stage of the apparatus when the apparatus stops that is, when the toothed wheel 27 ceases operating.

Along the periphery of the box 44 and the outer casing 37 openings for atmospheric air are provided as shown at 45 and 46, respectively.

The bottom 23 of the vat communicates with at least one tube 47 for the introduction of air, opening into the box 44 or directly into the atmosphere; said air is sucked into the vat 23 by the centrifugal action of the plate 24 and pins 25 and it cooperates in the oxidation of the solid substances which are being beaten and/or dispersed within the vat 23.

The metered admixture, if required, of a collecting reagent such as oleic acid is performed through a pipe 48 in such a manner that the collecting reagent thus added in very small amounts to the agitated water may act in the desired manner on the procedure.

This introduction of a collecting reagent is performed advantageously at the input of the second stage when a centrifugal two-stage apparatus is used.

The liquid being beaten should remain in stage I during a time which depends obviously on the output of liquid through the funnel 31, on the capacity of the vat 23 and also on the positioning of the annular overflow member 32. As a matter of fact, the more the annular member is lowered inside the vat, the longer becomes the detention period of the water in the first stage.

Sewerage frequently contains frothing agents, or tensio-active substances and there is found that there is an intense formation of free froth while the water is retained in the vat 23.

This is a further reason for using the annular overflow member 32 and also for covering the whole apparatus with a cover 36 which is removable so as to facilitate maintenance of the apparatus.

As already mentioned, the centrifugal apparatus forming the second stage is constructed in accordance with the teachings of the French Patent 1,027,417. Said apparatus includes a rotor 51 which allows driving the liquid and dispersing the substances as desired; in the example illustrated, rotor 51 is fed with liquid from the channel 38.

The upper section of rotor 51 is substantially in the shape of a downwardly opening bell 52 underneath which there is secured by screws 54 and pins 55, a flaring member 56 extending upwardly and coaxially supporting the spindle 28 rotating as a unit with the beating member 24 and the toothed disc 27.

The flaring member 56 is integrally formed with a stub shaft 57 extending downwardly and vertically and rotating inside the ball bearings 58 carried in a stationary sleeve 59 which is rigidly secured by screws 60 to a tubular stationary supporting sleeve 61.

To the lower end of the stationary sleeve 59 is secured, by screws 62, a bearing support member 63 inside which a downwardly directed extension $57^1$ of the shaft 57 carrying a beating member $57^2$ is arranged to revolve.

On the upper surface of the flaring member 56 and between the latter and the rotor 51 are provided impeller blades 64 (FIG. 2) which serve as stays between said flaring member 56 and the rotor 51 and also for driving the liquid towards the inner periphery of the rotor 51 and for simultaneously drawing in air and/or gas which thus acquires the peripheral speed of the bowl or rotor 51.

The liquid or liquids introduced through the channel 38 drop onto the flaring member 56 and spread over the inner cylindrical wall of the rotor 51 from which they are finally released in the form of a thin and uniform high velocity sheet of liquid.

The liquid which is released from the lower end of the cylindrical section of the rotor 51 under the action of centrifugal force as a high velocity sheet or film is projected radially outwardly in a substantially horizontal direction.

The liquid sheet passing out of said cylindrical rotor 51 impinges against an impact surface constituted by a suitably formed metal sheet 65 extending across the tangential path assumed by the liquid as soon as it released from the bottom of the cylindrical wall 51.

The centrifugal apparatus forming the second stage of the apparatus described serves for the dispersion of the air in the form of miniature bubbles inside the treated water which has been subjected to a preliminary oxidizing beating in the first stage. Said second stage may, if required, be omitted if the time during which the liquid stays in the first stage is increased.

The result of the treatment of sewerage in accordance with my improved method utilizing either a single stage or double stage centrifugal apparatus yields the following test results.

| Property | Before treatment | After treatment |
|---|---|---|
| pH | 6.1 | 7. |
| Density of suspended substances. | 180 mmg./litre | Non-measurable amounts. |
| Appearance | Turbid and colored | Transparent and colorless. |
| Reaction to $KMnO_4$ | Clear | Indifferent. |

While I have shown and described what I believe to be the best embodiments of my invention, it will be apparent to those skilled in the art that various changes and modifications may be made therein without departing from the spirit and scope of the invention as defined in the appended claims.

What I claim is:

1. The method of purifying water which contains impurities a portion of which are flocculable and the remainder of which are non-flocculable which comprises the steps of: adding to said impure water a water soluble mineral salt which flocculates upon the addition of an electrolyte; subjecting said impure water with said salt in solution to agitation in the presence of air to obtain complete oxidation of the oxidizable constituents thereof; forming the impure water with its oxidized constituents into a high velocity sheet surrounded by air; directing said sheet against an impact surface for producing an intimate mixture of water, miniature air bubbles and impurities; adding said electrolyte to said impure water no later than said directing step; conveying said mixture to a separation tank; permitting flocs including said bubbles to form in said separation tank whereby said flocs rise to the surface leaving purified liquid below; skimming said flocs from the top of the liquid in said separation tank; and withdrawing purified liquid from beneath said flocs.

2. The method according to claim 1, wherein said salt is ferrous sulphate, said salt being converted to ferric sulphate during the course of said agitating step.

3. The method according to claim 1, comprising the further step of adding a frothing agent to said impure liquid prior to completion of said directing step.

4. The method of purifying water which contains impurities, a portion of which are flocculable and the remainder of which are non-flocculable which comprises the steps of: adding to said impure water a water-soluble mineral salt which flocculates upon addition of an electrolyte; subjecting said impure water with said salt in solution to a beating action in the presence of air to obtain complete oxidation of the oxidizable constituents thereof; forming the impure water with its oxidized constituents into a high velocity sheet surrounded by air; directing said sheet against an impact surface for producing an intimate mixture of water, miniature air bubbles and impurities; adding said electrolyte to said impure water no later than said directing step; conveying said mixture to a separation tank; permitting flocs including said bubbles to form in said separation tank whereby said flocs rise to the surface leaving purified liquid below; skimming said flocs from the top of the liquid in said separation tank; and withdrawing purified liquid from beneath said flocs.

References Cited

FOREIGN PATENTS 622,282 4/1949 Great Britain.

MICHAEL E. ROGERS, *Primary Examiner.*